United States Patent
Wang et al.

(10) Patent No.: US 6,999,928 B2
(45) Date of Patent: Feb. 14, 2006

(54) METHOD AND APPARATUS FOR SPEAKER IDENTIFICATION USING CEPSTRAL COVARIANCE MATRICES AND DISTANCE METRICS

(75) Inventors: Zhong-Hua Wang, White Plains, NY (US); David Lubensky, Danbury, CT (US); Cheng Wu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 09/934,042

(22) Filed: Aug. 21, 2001

(65) Prior Publication Data

US 2003/0078776 A1 Apr. 24, 2003

(51) Int. Cl.
*G10L 17/00* (2006.01)
(52) U.S. Cl. .................. 704/250; 704/251; 704/255
(58) Field of Classification Search ................ 704/238, 704/246, 250
See application file for complete search history.

(56) References Cited

U.S. PATENT DOCUMENTS 5,167,004 A * 11/1992 Netsch et al. ............... 704/200

(Continued)

OTHER PUBLICATIONS

Magrin-Chagnolleau et al "Indexing Telephone Conversations by Speakers Using Time-frequency Principal Component Analysis", ICME 2000, pp 881-884.*

(Continued)

*Primary Examiner*—Susan McFadden
*Assistant Examiner*—Michael N. Opsasnick
(74) *Attorney, Agent, or Firm*—F.Chau & Associates, LLC

(57) ABSTRACT

Disclosed is a method of automated speaker identification, comprising receiving a sample speech input signal from a sample handset; deriving a cepstral covariance sample matrix from the first sample speech signal; calculating, with a distance metric, all distances between the sample matrix and one or more cepstral covariance signature matrices; determining if the smallest of the distances is below a predetermined threshold value; and wherein the distance metric is selected from $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

fusion derivatives thereof, and fusion derivatives thereof with $$d_1(S, \Sigma) = \frac{A}{H} - 1.$$

19 Claims, 2 Drawing Sheets

"

U.S. PATENT DOCUMENTS

| | | | | |
|---|---|---|---|---|
| 5,590,242 | A | * | 12/1996 | Juang et al. ................. 704/245 |
| 5,751,903 | A | * | 5/1998 | Swaminathan et al. ..... 704/230 |
| 5,960,395 | A | * | 9/1999 | Tzirkel-Hancock ......... 704/241 |
| 5,995,927 | A | * | 11/1999 | Li ............................. 704/246 |
| 6,539,352 | B1 | * | 3/2003 | Sharma et al. .............. 704/249 |

OTHER PUBLICATIONS

Mak, "Estimation of Elliptical Basis Function Parameters by the EM Alorithm with Application to Speaker Verification", IEEE Transactions on Neural Networks, vol. 11 No. 4, Jul. 2000, pp 961-969.*

Paliwal, "A Study of LSF Representation for Speaker-dependent and Speaker-independent HMM Based Speech Recognition Systems", 1990 ICASSP, pp. 801-804.*

Schmidt et al, "Covariance Estimation Methods for Channel Robust Text-independent Speaker Identification", ICASSP 1995, pp.333-336.*

Alonso-Martinez et al, "Speaker Identification in Masimatch Training and Testing Conditions", ICASSP 2000, pp. 1181-1184.*

Brummer et al, "An Euclidean Distance Measure between Covariance Matrices of Speech Cepstra for Text-independent Speaker Recognition", COSMIG 1997, pp 167-172.*

Zhong-Hua Wang et al., *New Distance Measures for Text-independent Speaker Identification,* International Conference for Spoken Language Processing (2000), no month day.

Sonmez, M.K., *Progressive Cepstral Normalization for Robust Speech Recognition/Speaker Identification,* Institute for Systems Research, Aug. 4, 1999.

* cited by examiner

METHOD AND APPARATUS FOR SPEAKER IDENTIFICATION USING CEPSTRAL COVARIANCE MATRICES AND DISTANCE METRICS

FIELD OF THE INVENTION

This invention relates to speaker identification using cepstral covariance matrices and distance metrics.

BACKGROUND OF THE INVENTION

Automatic verification or identification of a person by their speech is attracting greater interest as an increasing number of business transactions are being performed over the phone, where automatic speaker identification is desired or required in many applications. In the past several decades, three techniques have been developed for speaker recognition, namely (1) Gaussian mixture model (GMM) methods, (2) vector quantization (VQ) methods, and (3) various distance measure methods. The invention is directed to the last class of techniques.

The performance of current automatic speech and speaker recognition technology is quite sensitive to certain adverse environmental conditions, such as background noise, channel distortions, speaker variations, and the like. The handset distortion is one of the main factors that contribute to degradation of the speech and speaker recognizer. In the current speech technology, the common way to remove handset distortion is the cepstral mean normalization, which is based on the assumption that handset distortion is linear.

In the art of distance metrics speech identification, it is well known that covariance matrices of speech feature vectors, or cepstral vectors, carry a wealth of information on speaker characteristics. Cepstral vectors are generally obtained by inputting a speech signal and dividing the signal into segments, typically 10 milliseconds each. A fast Fourier transform is performed on each segment and the energy calculated for each of N frequency bands. The logarithm of the energy for each band is subject to a cosine transformation, thereby yielding a cepstral vector having N elements. The frequency bands are not usually equally spaced, but rather are scaled, such as mel-scaled, for example, as by the equation mf=1125 log(0.0016f+1), where f is the frequency in Hertz and mf is the mel-scaled frequency.

Once a set of N cepstral vectors, c1, c2 ... cN, has been obtained a covariance matrix may be derived by the equation:

$$S=[(c1-m)^T(c1-m)+(c2-m)^T(c2-m)+\ldots+(cN-m)^T(cN-m)]/N \quad (1)$$

where T indicates a transposed matrix, m is the mean vector m=(c1+c2+ ... +cK)/K where K is the number of frames of speech signal, and S is the N×N covariance matrix.

Let S and Σ be covariance matrices of cepstral vectors of clips of testing and training speech signals, respectively, that is to say that S is matrix for the sample of speech that we wish to identify and Σ is a matrix for the voice signature of a known individual. If the sample and signature speech signals are identical, then S=Σ, which is to say that SΣ⁻¹ is an identity matrix, and the speaker is thereby identified as the known individual. Therefore, the matrix SΣ⁻¹ is a measure of the similarity of the two voice clips and is referred to as the "similarity matrix" of the two speech signals.

The arithmetic, A, geometric, G, and harmonic, H, means of the eigenvalues $I(i=1, \ldots, N)$ of the similarity matrix are defined as follows:

$$A(\lambda_1, \ldots, \lambda_N) = \frac{1}{N}\sum_{i=1}^{N} \lambda_i = \frac{1}{N} Tr(S\Sigma^{-1}) \quad (2a)$$

$$G(\lambda_1, \ldots, \lambda_N) = \left(\prod_{i=1}^{N} \lambda_i\right)^{1/N} = (Det(S\Sigma^{-1}))^{1/N} \quad (2b)$$

$$H(\lambda_1, \ldots, \lambda_N) = N\sum_{i=1}^{N}\left(\frac{1}{\lambda_i}\right)^{-1} = N(Tr(S\Sigma^{-1}))^{-1} \quad (2c)$$

where Tr( ) is the trace of a matrix and Det( ) is the determinant of a matrix.

These values can be obtained without explicit calculation of the eigenvalues and therefore are significantly efficient in computation. Also, they satisfy the following properties:

$$A\left(\frac{1}{\lambda_1}, \ldots, \frac{1}{\lambda_N}\right) = \frac{1}{H(\lambda_1, \ldots, \lambda_N)} \quad (3a)$$

$$G\left(\frac{1}{\lambda_1}, \ldots, \frac{1}{\lambda_N}\right) = \frac{1}{G(\lambda_1, \ldots, \lambda_N)} \quad (3b)$$

$$H\left(\frac{1}{\lambda_1}, \ldots, \frac{1}{\lambda_N}\right) = \frac{1}{A(\lambda_1, \ldots, \lambda_N)} \quad (3c)$$

Various distance measures have been constructed based upon these mean values, primarily for purposes of speaker identification, the most widely known being:

$$d_1(S, \Sigma) = \frac{A}{H} - 1 \quad (4a)$$

$$d_2(S, \Sigma) = \frac{A}{G} - 1 \quad (4b)$$

$$d_3(S, \Sigma) = \frac{A^2}{GH} - 1 \quad (4c)$$

$$d_4(S,\Sigma)=A-\log(G)-1 \quad (4d)$$

wherein if the similarity matrix is positive definite, the mean values satisfy the equation $A \geq G \geq H$ with equality if and only if $\lambda_1=\lambda_2=\ldots=\lambda_N$. Therefore, all the above distance measures satisfy the positivity condition. However, if we exchange S and Σ (or the position of sample and signature speech signals), $S \ S^{-1} > S\Sigma^{-1}$ and $I_i > 1/I_i$, and find that $d_1$ satisfies the symmetric property while $d_2$, $d_3$, and $d_4$ do not. The symmetry property is a basic mathematic requirement of distance metrics, therefore $d_1$ is generally in more widespread use than the others.

As stated, the cepstral mean normalization assumes linear distortion, but in fact the distortion is not linear. When applied to cross-handset speaker identification (meaning that the handset used to create the signature matrices is different than the one used for the sample) using the Lincoln Laboratory Handset Database (LLHD), the cepstral mean normalization technique has an error rate in excess of about 20%. Consider that the error rate for same-handset speaker identification is only about 7%, and it can be seen that channel distortion caused by the handset is not linear. What is needed is a method to remove the nonlinear components of handset distortion.

SUMMARY OF THE INVENTION

Disclosed is a method of automated speaker identification, comprising receiving a sample speech input signal from a sample handset; deriving a cepstral covariance sample matrix from said first sample speech signal; calculating, with a distance metric, all distances between said sample matrix and one or more cepstral covariance signature matrices; determining if the smallest of said distances is below a predetermined threshold value; and wherein said distance metric is selected from $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

fusion derivatives thereof, and fusion derivatives thereof with $$d_1(S, \Sigma) = \frac{A}{H} - 1.$$

In another aspect of the invention, the method further comprises identifying said sample handset; identifying a training handset used to derive each said signature matrix; wherein for each said signature matrix, an adjusted sample matrix is derived by adding to said sample matrix a distortion matrix comprising distortion information for said training handset used to derive said signature matrix; and wherein for each signature matrix, an adjusted signature matrix is derived by adding to each said signature matrix a distortion matrix comprising distortion information for said sample handset.

In another aspect of the invention, the step of identifying said sample handset further comprises calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

In another aspect of the invention, said distance metric satisfies symmetry and positivity conditions.

In another aspect of the invention, said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

In another aspect of the invention, the step of identifying said training handset for each said signature matrix further comprises calculating, with a distance metric, all distances between said signature matrix and one or more cepstral covariance handset matrices, wherein each said handset matrix is derived from a plurality of speech signals taken from different speakers through the same handset; and determining if the smallest of said distances is below a predetermined threshold value.

In another aspect of the invention, said distance metric satisfies symmetry and positivity conditions.

In another aspect of the invention, said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

Disclosed is a method of automated speaker identification, comprising receiving a sample speech input signal from a sample handset; deriving a cepstral covariance sample matrix from said first sample speech signal; calculating, with a distance metric, all distances between an adjusted sample matrix and one or more adjusted cepstral covariance signature matrices, each said signature matrix derived from training speech signals input from a training handset; determining if the smallest of said distances is below a predetermined threshold value; wherein for each said signature matrix, said adjusted sample matrix is derived by adding to said sample matrix a distortion matrix comprising distortion information for said training handset used to derive said signature matrix; and wherein each said adjusted signature matrix is derived by adding to each said signature matrix a distortion matrix comprising distortion information for said sample handset.

In another aspect of the invention, said distance metric satisfies symmetry and positivity conditions.

In another aspect of the invention, said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

In another aspect of the invention, said sample handset is identified by a method comprising calculating, with a distance metric, all distances between said sample matrix and one or more cepstral covariance handset matrices, wherein each said handset matrix is derived from a plurality of speech signals taken from different speakers through the same handset; and determining if the smallest of said distances is below a predetermined threshold value.

In another aspect of the invention, said distance metric satisfies symmetry and positivity conditions.

In another aspect of the invention, wherein said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

In another aspect of the invention, for each said signature matrix, said training handset is identified by a method comprising calculating, with a distance metric, all distances between said signature matrix and one or more cepstral covariance handset matrices, wherein each said handset matrix is derived from a plurality of speech signals taken from different speakers through the same handset; and determining if the smallest of said distances is below a predetermined threshold value.

In another aspect of the invention, said distance metric satisfies symmetry and positivity conditions.

In another aspect of the invention, said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

Disclosed is a program storage device, readable by machine, tangibly embodying a program of instructions executable by the machine to perform method steps for automated speaker identification, said method steps comprising receiving a sample speech input signal from a sample handset; deriving a cepstral covariance sample matrix from said first sample speech signal; calculating, with a distance metric, all distances between said sample matrix and one or more cepstral covariance signature matrices; determining if the smallest of said distances is below a predetermined threshold value; and wherein said distance metric is selected from $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

fusion derivatives thereof, and fusion derivatives thereof with $$d_1(S, \Sigma) = \frac{A}{H} - 1.$$

Disclosed is a program storage device, readable by machine, tangibly embodying a program of instructions executable by the machine to perform method steps for automated speaker identification, said method steps comprising receiving a sample speech input signal from a sample handset; deriving a cepstral covariance sample matrix from said first sample speech signal; calculating, with a distance metric, all distances between an adjusted sample matrix and one or more adjusted cepstral covariance signature matrices, each said signature matrix derived from training speech signals input from a training handset; determining if the smallest of said distances is below a predetermined threshold value; wherein for each said signature matrix, said adjusted sample matrix is derived by adding to said sample matrix a distortion matrix comprising distortion information for said training handset used to derive said signature matrix; and wherein each said adjusted signature matrix is derived by adding to each said signature matrix a distortion matrix comprising distortion information for said sample handset.

DETAILED DESCRIPTION OF PREFERRED EMBODIMENTS

Figure 1:
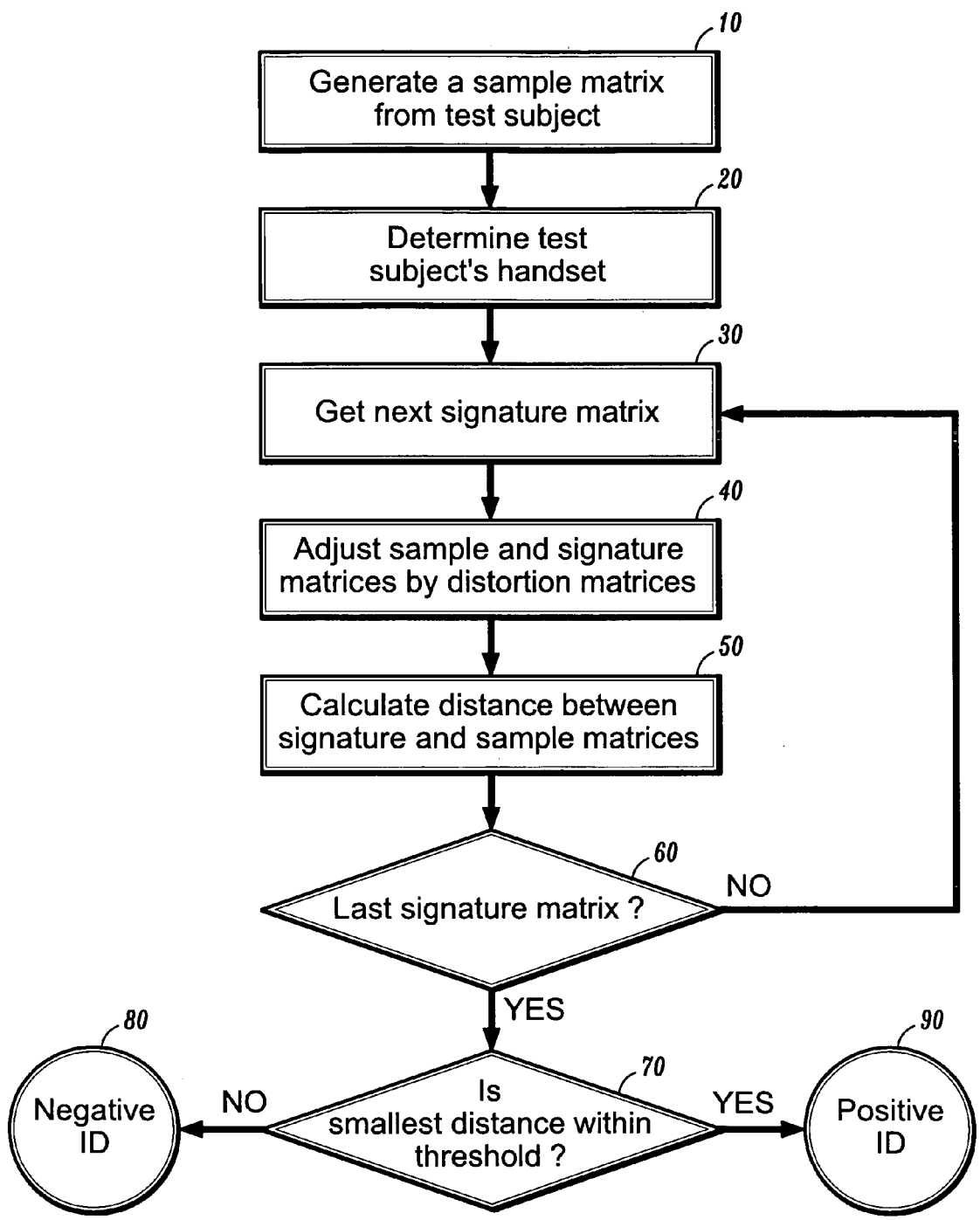
FIG. 1 is a flowchart of an embodiment of the invention.

Referring to FIG. 1, the process of the invention begins at node 10 wherein a cepstral covariant sample matrix S is generated from a speech signal received from a test subject whom the practitioner of the invention wishes to identify. The derivation may be by any one of a number of known methods such as those described in A. Cohen et al., *On text-independent speaker identification using automatic acoustic segmentation,* ICASSP, pp. 293–296, 1985; and S. B. Davis et al., *Comparison of parametric representations for monosyllabic word recognition in continuously spoken sentences,* IEEE, 1980, the disclosures of both of which are incorporated by reference herein in their entirety.

At node 20, the optional step of determining the test subject's handset is executed. In real-world applications, it is most probable that the handset used to create signature matrices are different than the one used to receive the test subject's voice for the sample matrix. The distortion added to the matrices by the different handsets blurs the similarity of the voices and results in higher misidentification rates.

The method of determining the test subject's handset is by calculating the distances between the sample matrix and a database of handset matrices, each representative of a particular make and model of handset. The shortest distance determines the identity of the test subject's handset. Such a method is described in commonly assigned copending U.S. patent application Wang et al., METHOD AND APPARATUS FOR HANDSET IDENTIFICATION, filed Aug. 21, 2001, U.S. patent application Ser. No. 09/934,157, the disclosures of which are incorporated by reference herein in their entirety.

The generation of handset matrices is performed for a particular handset by having a substantial number of different speakers provide speech samples through the handset, preferably at least ten such samples, more preferably at least twenty. A cepstral covariance matrix is then generated for the handset from all the samples, thereby creating a handset matrix M. Because all the speakers are different, the speaker characteristics of the covariance matrix are smeared away, leaving the handset information.

In a preferred embodiment, a database of handset matrices will be kept and updated periodically as new makes and models of handsets come on the market.

Flow now moves to optional node 30 where a database of signature matrices is access and the first signature matrix S retrieved.

Control now flows to node 40 where the optional adjustment of the sample and signature matrices is performed. This part of the process corrects the cross-handset distortion caused by the test subject using a different handset then that which was used to generate the signature matrix—the training handset. This is done by first adding to the sample matrix S a distortion matrix $D_h$ corresponding to the training handset. Of course, if it has been determined that the test subject is using the same handset as the training handset, then this step may be skipped altogether, though executing it anyway will do no harm. Preferably, information identifying the training handset will be stored with each signature matrix for rapid identification. A slower method would be to test the signature matrix in the same manner the sample matrix was tested at node 20.

Figure 2:
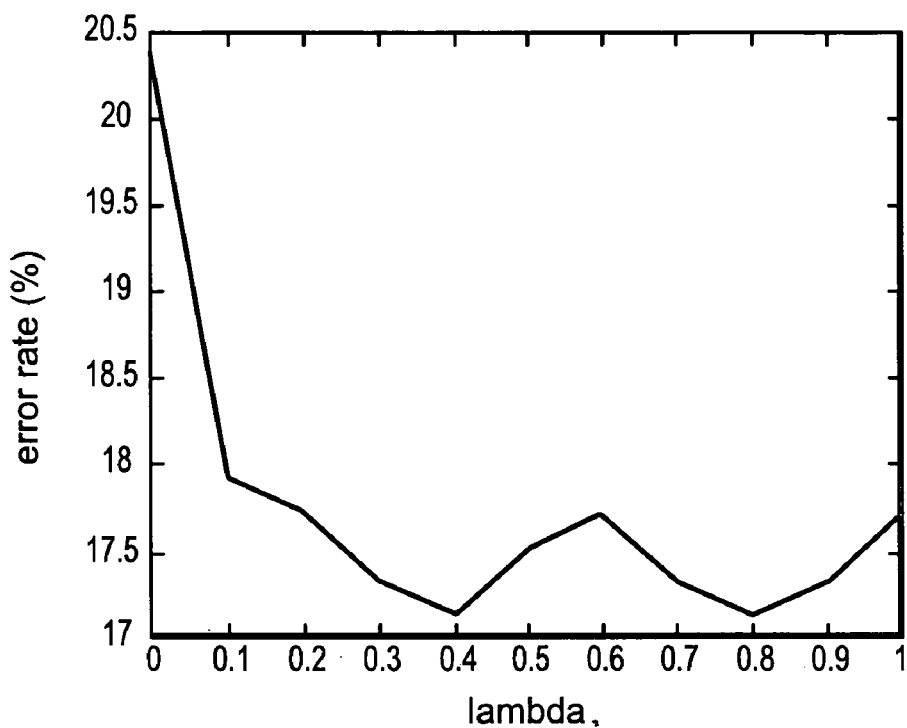
FIG. 2 is a graph of experimental data.

To generate the distortion matrix, the handset matrix of the training handset is multiplied by a scaling factor I, such that:

$$D_h = IM_h \tag{5}$$

where $D_h$ is the distortion matrix for handset h and $M_h$ is the handset matrix taken over all the speech samples for handset h. The scaling factor I will be chosen so as to provide the greatest accuracy of speaker identification. This is determined experimentally, but may be expected to be approximately equal to about 0.4 or 0.8 as can be seen in FIG. 2. The graph in FIG. 2 was generated from the example described below.

By adding the sample and distortion matrices, there is generated a adjusted sample matrix S' that now contains information about the distortion caused by the training handset. Note that S' already has information about the distortion of the handset used by the test subject because that was the handset used to generate S.

Note, however, that if this is a cross-handset situation, then the signature matrix must also be adjusted. Therefore, the signature matrix is added to the distortion matrix corresponding to the handset detected at node 20, namely the handset being used by the test subject. Now both the adjusted sample matrix S' and the adjusted signature matrix S' have distortion information for both handsets in addition to voice information.

Control now flows to node 50 where the distance between the adjusted sample S' and adjusted signature S' matrices is calculated. Because we have adjusted for cross-handset situations, the distance will be a function of the difference in voice information rather than handset information. As stated above, there are four well known distance formulae in use as are described in H. Gish, *Robust discrimination in automatic speaker identification,* Proceedings ICASSP 1990, vol. 1, pp. 289–292; F. Bimbot et al., *Second-order statistical measures for test-independent speaker identification,* ECSA workshop on automatic speaker recognition, identification and verification, 1994, pp. 51–54; and S. Johnson, *Speaker tracking,* Mphil thesis, University of Cambridge, 1997, and references therein; the disclosures of all of which are incorporated by reference herein in their entirety. Of those, the first $d_1$ is the most favored for its symmetry and positivity. To this collection may be added five new inventive distance measures:

$$d_5(S, \Sigma) = A + \frac{1}{H} - 2 \qquad (6a)$$

$$d_6(S, \Sigma) = \left(A + \frac{1}{H}\right)\left(G + \frac{1}{G}\right) - 4 \qquad (6b)$$

$$d_7(S, \Sigma) = \frac{A}{2H}\left(G + \frac{1}{G}\right) - 1 \qquad (6c)$$

$$d_8(S, \Sigma) = \frac{\left(A + \frac{1}{H}\right)}{\left(G + \frac{1}{G}\right)} - 1 \qquad (6d)$$

$$d_9(S, \Sigma) = \frac{A}{G} + \frac{G}{H} - 2 \qquad (6e)$$

all of which satisfy the positivity and symmetry conditions. Along with $d_1$, these distance metrics may be fused in any combination as described in K. R. Farrell, *Discriminatory measures for speaker recognition,* Proceedings of Neural Networks for Signal Processing, 1995, and references therein, the disclosures of which are incorporated by reference herein in their entirety. The example at the end of this disclosure demonstrates how fusion is accomplished.

Control now flows through nodes 60 and 30 in a loop until the distances between the adjusted sample matrix S' and every adjusted signature matrix S' is calculated.

After all the signature matrices have been run through and distances calculated for all of them, control flows to node 70 where the smallest distance is examined to determine if it remains below a predetermined threshold value. If not, control flows to termination node 80, indicating that the sampled voice failed to match any of those in the signature database. If, however, the distance is below the chosen threshold, then control flows to termination node 90, indicating that a positive identification has been made.

The method of the invention may be embodied in a software program on a computer-readable medium and rigged so that the identification process initiates as soon as a call comes in and the person on the line has spoken his first words.

EXAMPLE

An LLHDB (Lincoln Laboratory Handset Database) corpus of recorded utterances was used, such as is described in D. A. Reynolds, *HTIMIT and LLHDB: speech corpora for the study of handset transducer effects,* ICASSP, pp. 1535–1538, May 1977, Munich, Germany, the disclosures of which are incorporated by reference herein in their entirety. Twenty eight female and 24 male speakers were asked to speak ten sentences extracted from the TIMIT corpus and the rainbow passage (from the LLHDB corpus) over nine handsets and a Sennheizer high-quality microphone. The average length of the spoken rainbow passages was 61 seconds. In this experiment, the rainbow passage was used for generating signature matrices, and the remaining utterances for sample matrices. One handset chosen at random was designated "cb1" and another "cb2". These are the actual handsets used for same-handset and cross-handset testing.

A 13 static mel-cepstra and a 13 delta mel-cepstra were calculated from a five frame interval. For each utterance, one full covariance matrix was calculated. The results are shown in Table I:

TABLE I

| Metric | Static (%) | Static + Ä (%) | Improvement (%) |
|--------|------------|----------------|-----------------|
| $d_1$  | 10.79      | 6.94           | 35.7            |
| $d_2$  | 14.64      | 9.25           | 36.8            |
| $d_3$  | 11.56      | 7.13           | 38.3            |
| $d_4$  | 26.20      | 26.20          | 0               |
| $d_5$  | 14.45      | 11.56          | 20              |
| $d_6$  | 26.20      | 23.89          | 8.8             |
| $d_7$  | 11.75      | 8.09           | 31.1            |
| $d_8$  | 10.98      | 6.94           | 36.8            |
| $d_9$  | 10.79      | 6.94           | 36.7            |

As can be seen from the data in Table I, inclusion of delta cepstral in the cepstral vectors greatly improves accuracy. It can also be seen that some of the novel distance measures yield results comparable to that of the widely used $d_1$. A data fusion of $d_1$ and $d_7$ was performed to yield a new distance metric:

$$d_{1-7} = (1-a)d_1 + ad_7 \qquad (7)$$

where a is referred to as the fusion coefficient and $0 \pounds a \pounds 1$. The linear combination of two symmetric and positive distance metrics yields a fused metric that is also symmetric and positive.

The distances between the handset matrices and the sample matrices were calculated for each distance formula and the error rates of handset detection derived, resulting in the data of Table II as follows:

TABLE II

| $d_1$ | $d_2$ | $d_3$ | $d_4$ | $d_5$ | $d_6$ | $d_7$ | $d_8$ | $d_9$ |
|-------|-------|-------|-------|-------|-------|-------|-------|-------|
| 11.9% | 12.6% | 11.7% | 15%   | 13.3% | 17.5% | 13.2% | 11.5% | 11.9% |

The error rate of handset detection was graphed using distance metric $d_1$, as can be seen in FIG. 2. From the graph of FIG. 2, it was decided to set the distortion scaling factor I=0.4 for this experiment. It should be noted that the setting of an optimal distortion scaling factor is optional because, as can be seen from FIG. 2, optionally setting I=1.0 does not introduce that much more error. The distortion scaling factor is largely independent of the distance metric used to graph it, but rather is dependent upon handset characteristics. Therefore, if highly accurate results are desired, a different distortion scaling factor graph should be generated for every different handset pair.

Distortion matrices were generated for each handset and the distances calculated to the speech samples.

Figure 3:
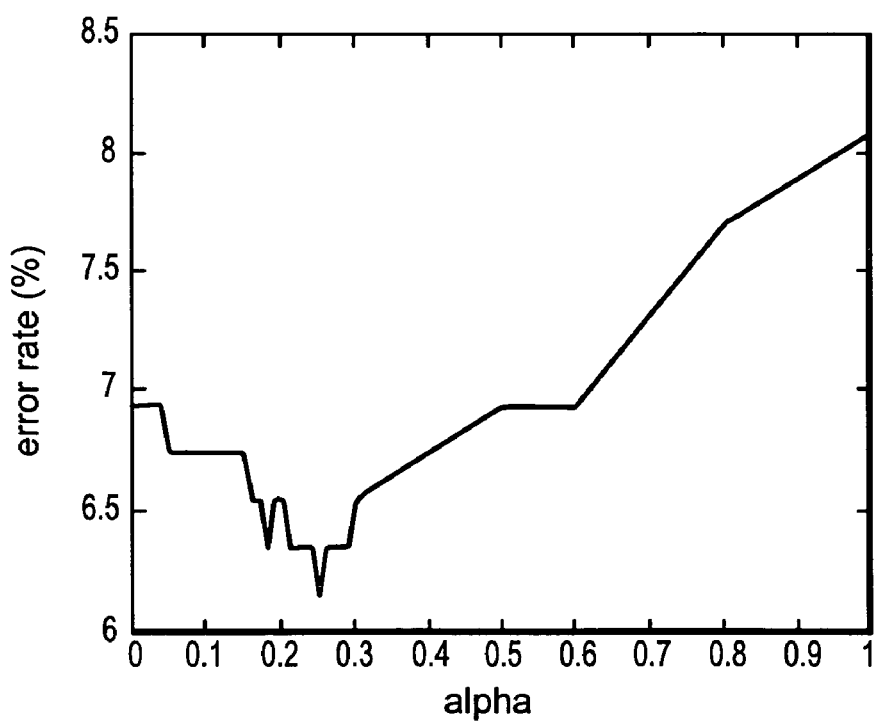
FIG. 3 is a graph of experimental data.

FIG. 3 shows the error rate of speaker identification as a function of the fusion coefficient a. The experiment demonstrates that when N=26 and a=0.25, the error rate obtained is only 6.17% for the fused metric, as opposed to 6.94% for the $d_1$ metric alone—an 11% improvement.

It can therefore be seen that the invention provides good speaker identification performance with a variety of choices of symmetrical and positive distance metrics. It can be seen that the use of addition of delta cepstra in the cepstral vectors can decrease the error rate by as much as 38% and the use of data fusion with novel distance metrics further decreases error rates by about 11%. A further reduction in error rates of about 17% may be obtained through a novel method of cross-handset adjustment.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of automated speaker identification, comprising:
    receiving a sample speech input signal from a sample handset;
    deriving a cepstral covariance sample matrix from said first sample speech signal;
    calculating, with a distance metric, all distances between said sample matrix and one or more cepstral covariance signature matrices;
    determining if the smallest of said distances is below a predetermined threshold value; and
    wherein said distance metric is selected from $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

fusion derivatives thereof, and fusion derivatives thereof with $$d_1(S, \Sigma) = \frac{A}{H} - 1.$$

2. The method of claim 1 further comprising:
    identifying said sample handset;
    identifying a training handset used to derive each said signature matrix;
    wherein for each said signature matrix, an adjusted sample matrix is derived by adding to said sample matrix a distortion matrix comprising distortion information for said training handset used to derive said signature matrix; and
    wherein for each signature matrix, an adjusted signature matrix is derived by adding to each said signature matrix a distortion matrix comprising distortion information for said sample handset.

3. The method of claim 2, wherein the step of identifying said sample handset further comprises:
    calculating, with a distance metric, all distances between said sample matrix and one or more cepstral covariance handset matrices, wherein each said handset matrix is derived from a plurality of speech signals taken from different speakers through the same handset; and
    determining if the smallest of said distances is below a predetermined threshold value.

4. The method of claim 3 wherein said distance metric satisfies symmetry and positivity conditions.

5. The method of claim 4, wherein said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and
fusion derivatives thereof.

6. The method of claim 2, wherein the step of identifying said training handset for each said signature matrix further comprises:
    calculating, with a distance metric, all distances between said signature matrix and one or more cepstral covariance handset matrices, wherein each said handset matrix is derived from a plurality of speech signals taken from different speakers through the same handset; and
    determining if the smallest of said distances is below a predetermined threshold value.

7. The method of claim 6 wherein said distance metric satisfies symmetry and positivity conditions.

8. The method of claim 7, wherein said distance metric is selected from $$d_1(S, \Sigma) = \frac{A}{H} - 1,$$

-continued $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

9. A method of automated speaker identification, comprising:
   receiving a sample speech input signal from a sample handset;
   deriving a cepstral covariance sample matrix from said first sample speech signal;
   calculating, with a distance metric, all distances between an adjusted sample matrix and one or more adjusted cepstral covariance signature matrices, each said signature matrix derived from training speech signals input from a training handset;
   determining if the smallest of said distances is below a predetermined threshold value;
   wherein for each said signature matrix, said adjusted sample matrix is derived by adding to said sample matrix a distortion matrix comprising distortion information for said training handset used to derive said signature matrix; and
   wherein each said adjusted signature matrix is derived by adding to each said signature matrix a distortion matrix comprising distortion information for said sample handset.

10. The method of claim 9, wherein said distance metric satisfies symmetry and positivity conditions.

11. The method of claim 10, wherein said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

12. The method of claim 9, wherein said sample handset is identified by a method comprising:
   calculating, with a distance metric, all distances between said sample matrix and one or more cepstral covariance handset matrices, wherein each said handset matrix is derived from a plurality of speech signals taken from different speakers through the same handset; and
   determining if the smallest of said distances is below a predetermined threshold value.

13. The method of claim 12, wherein said distance metric satisfies symmetry and positivity conditions.

14. The method of claim 13, wherein said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

$$d_9(S, \Sigma) = \frac{A}{G} + \frac{G}{H} - 2,$$

and fusion derivatives thereof.

15. The method of claim 9, wherein, for each said signature matrix, said training handset is identified by a method comprising:
   calculating, with a distance metric, all distances between said signature matrix and one or more cepstral covariance handset matrices, wherein each said handset matrix is derived from a plurality of speech signals taken from different speakers through the same handset; and
   determining if the smallest of said distances is below a predetermined threshold value.

16. The method of claim 15, wherein said distance metric satisfies symmetry and positivity conditions.

17. The method of claim 16, wherein said distance metric is selected from $$d_1(S, \Sigma) = \frac{A}{H} - 1,$$

$$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

-continued
$$d_9(S, \Sigma) = \frac{A}{G} + \frac{G}{H} - 2,$$

and
fusion derivatives thereof.

18. A program storage device, readable by machine, tangibly embodying a program of instructions executable by the machine to perform method steps for automated speaker identification, said method steps comprising:
receiving a sample speech input signal from a sample handset;
deriving a cepstral covariance sample matrix from said first sample speech signal;
calculating, with a distance metric, all distances between said sample matrix and one or more cepstral covariance signature matrices;
determining if the smallest of said distances is below a predetermined threshold value; and
wherein said distance metric is selected from $$d_5(S, \Sigma) = A + \frac{1}{H} - 2,$$

$$d_6(S, \Sigma) = \left(A + \frac{1}{H}\right)\left(G + \frac{1}{G}\right) - 4,$$

$$d_7(S, \Sigma) = \frac{A}{2H}\left(G + \frac{1}{G}\right) - 1,$$

$$d_8(S, \Sigma) = \frac{\left(A + \frac{1}{H}\right)}{\left(G + \frac{1}{G}\right)} - 1,$$

-continued
$$d_9(S, \Sigma) = \frac{A}{G} + \frac{G}{H} - 2,$$

fusion derivatives thereof, and
fusion derivatives thereof with $$d_1(S, \Sigma) = \frac{A}{H} - 1.$$

19. A program storage device, readable by machine, tangibly embodying a program of instructions executable by the machine to perform method steps for automated speaker identification, said method steps comprising:
receiving a sample speech input signal from a sample handset;
deriving a cepstral covariance sample matrix from said first sample speech signal;
calculating, with a distance metric, all distances between an adjusted sample matrix and one or more adjusted cepstral covariance signature matrices, each said signature matrix derived from training speech signals input from a training handset;
determining if the smallest of said distances is below a predetermined threshold value;
wherein for each said signature matrix, said adjusted sample matrix is derived by adding to said sample matrix a distortion matrix comprising distortion information for said training handset used to derive said signature matrix; and
wherein each said adjusted signature matrix is derived by adding to each said signature matrix a distortion matrix comprising distortion information for said sample handset.

* * * * *